No. 793,273. PATENTED JUNE 27, 1905.
G. BOTKIN.
MOTOR GEARING.
APPLICATION FILED AUG. 8, 1904.

3 SHEETS—SHEET 1.

Witnesses
M. C. Lyddane
C. H. Griesbauer

Inventor
George Botkin
by H. B. Wilson
Attorney

No. 793,273. PATENTED JUNE 27, 1905.
G. BOTKIN.
MOTOR GEARING.
APPLICATION FILED AUG. 8, 1904.

3 SHEETS—SHEET 2.

Witnesses
Inventor
George Botkin
by H. B. Wilson
Attorney

No. 793,273. PATENTED JUNE 27, 1905.
G. BOTKIN.
MOTOR GEARING.
APPLICATION FILED AUG. 8, 1904.

3 SHEETS—SHEET 3.

Witnesses
M. C. Lyddane.
C. H. Griesbauer.

Inventor
George Botkin.
by H. A. Wilson
Attorney

No. 793,273. Patented June 27, 1905.

UNITED STATES PATENT OFFICE.

GEORGE BOTKIN, OF KAHOKA, MISSOURI.

MOTOR-GEARING.

SPECIFICATION forming part of Letters Patent No. 793,273, dated June 27, 1905.

Application filed August 8, 1904. Serial No. 219,946.

*To all whom it may concern:*

Be it known that I, GEORGE BOTKIN, a citizen of the United States, residing at Kahoka, in the county of Clark and State of Missouri, have invented certain new and useful Improvements in Motor-Gearing; and I do declare the following to be a full, clear, and exact description of the invention, such as will enable others skilled in the art to which it appertains to make and use the same.

My invention relates to improvements in spring, weight, and other mechanical motors for operating churns, ice-cream freezers, and other machines.

The object of my invention is to improve and simplify the construction and operation of motors of this character, and thereby render them more durable and efficient in use and less expensive to manufacture.

With this and other objects in view the invention consists of certain novel features of construction, combination, and arrangement of parts, as will be hereinafter more fully described, and particularly pointed out in the appended claims.

Figure 1:
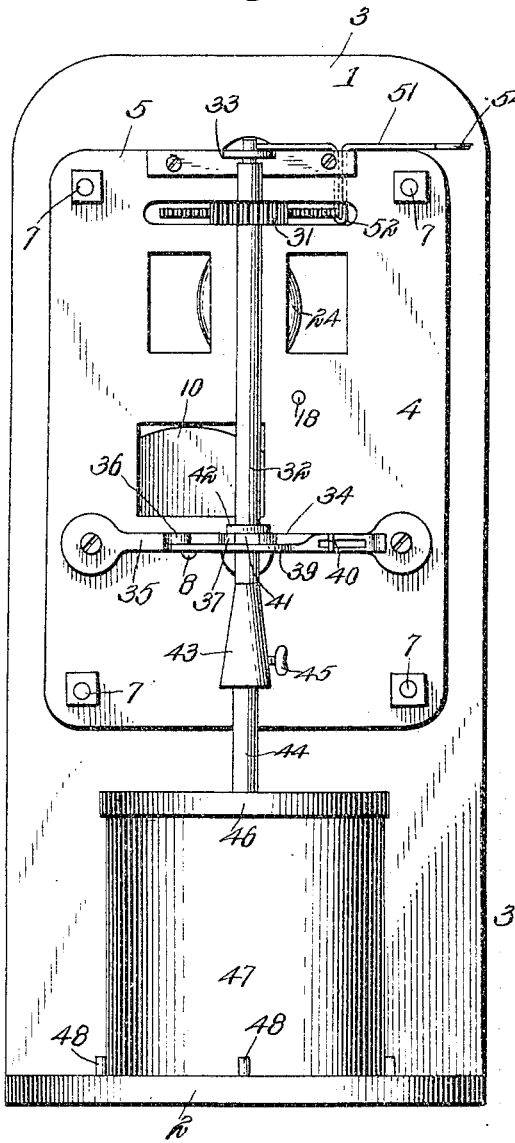
Figure 2:
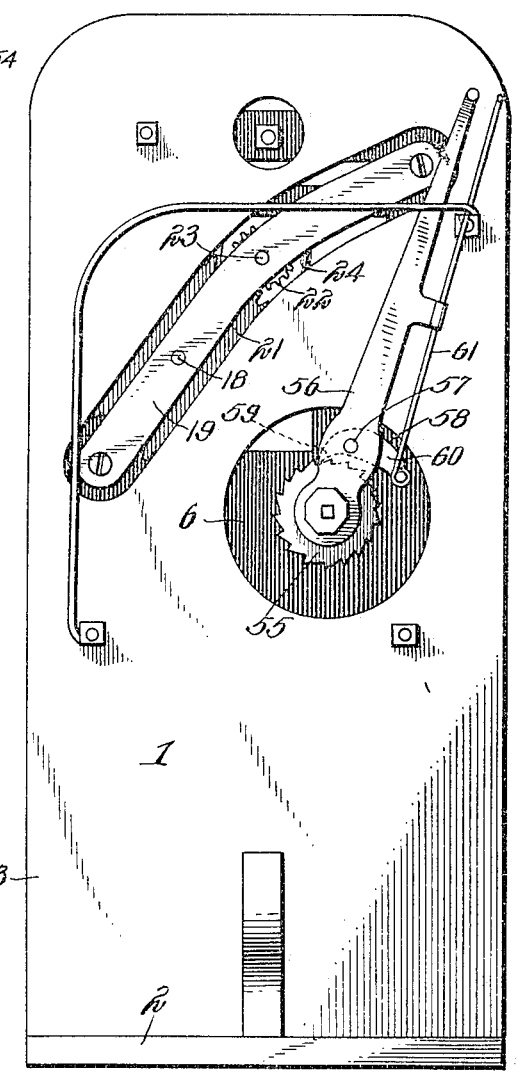
Figure 3:
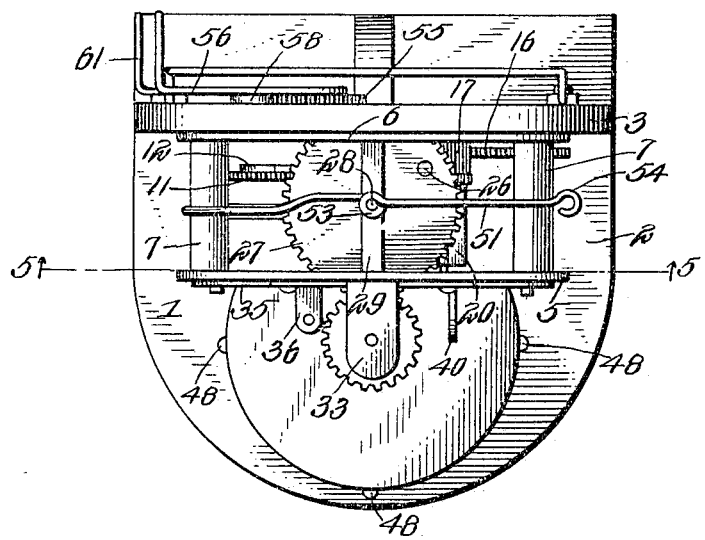
Figure 6:
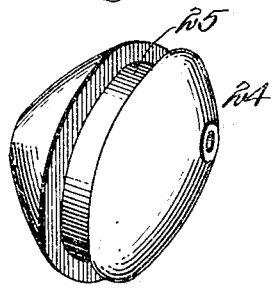
Figure 7:
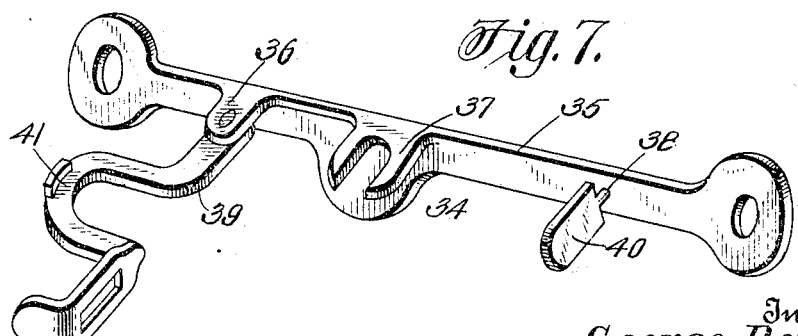
Figure 4:
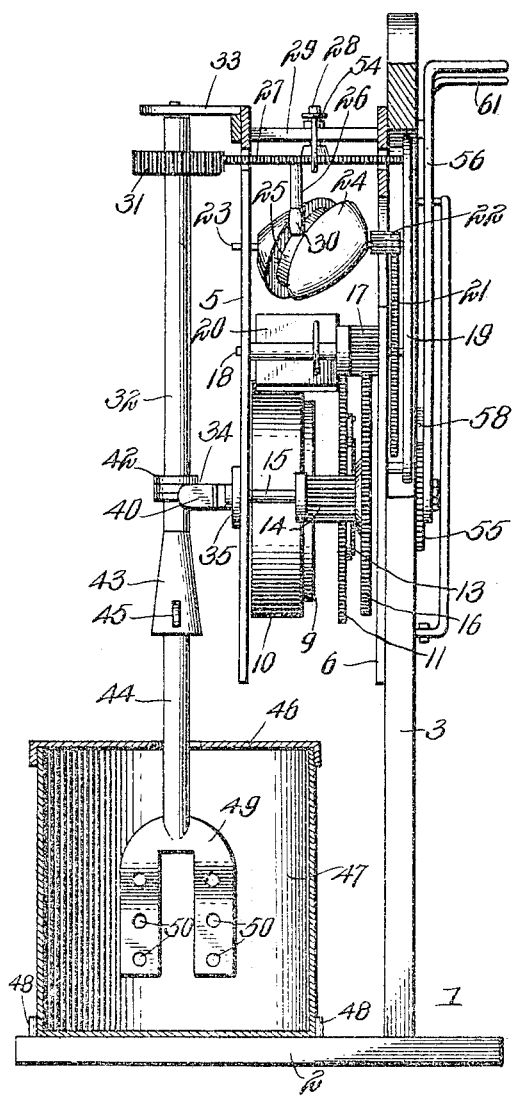
Figure 5:
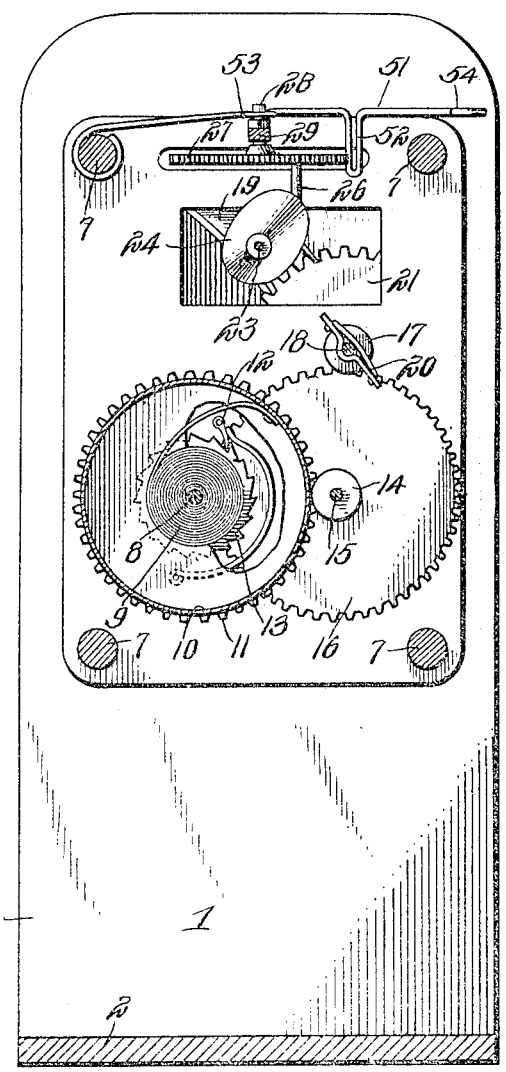

In the accompanying drawings, Figure 1 is a front elevation of my improved motor, showing the same applied to a churn. Fig. 2 is a rear elevation of the same. Fig. 3 is a top plan view. Fig. 4 is a side elevation with parts of the frame broken away and the body of the churn in section to more clearly illustrate the mechanism. Fig. 5 is a vertical sectional view taken on the line 5 5 of Fig. 3. Fig. 6 is a detail view of the wabbling cam-wheel, and Fig. 7 is a detail view of the lower horizontal bar for the dasher-shaft.

Referring to the drawings by numeral, 1 denotes a suitable frame, comprising a base 2 and an upright vertical portion 3, upon one side of which is mounted the frame 4 of a spring-motor. Said frame 4 comprises front and rear plates 5 and 6, which are connected together by bolts or rods 7. Journaled in bearings in the lower portion of the plates 5 and 6 is a winding-shaft 8, upon which is secured one end of a spring 9, the other end of which is secured to a circular casing 10, in which said spring is located. Said casing is non-revoluble and is secured to the plate 5. Mounted loosely upon said shaft, between the plates 5 and 6, is a gear-wheel 11, which is adapted to be locked to rotate with said shaft in one direction by means of a spring-actuated pawl 12, pivoted upon said wheel and engaging a ratchet-wheel 13, secured upon said shaft. This pawl-and-ratchet connection of the gear-wheel to the shaft is provided to permit the spring 9 to be wound without rotating said wheel. Said gear 11 meshes with the pinion 14, secured upon the shaft 15, journaled between the plates 5 and 6 and having fixed to it a gear 16, which meshes with the pinion 17, secured upon a shaft 18, journaled in bearings formed in the upper plate 5 and a supplemental arm or plate 19, secured to and spaced from the rear of the plate 6. Upon the front portion of said shaft 18, between the plates 5 and 6, is a governor 20, (here shown in the form of a fan-plate,) secured transversely upon said shaft and adapted to offer a resistance to the rotation of said shaft. Secured upon the rear portion of the shaft 18, between the plates 6 and 19, is a gear 21, which meshes with a pinion 22, fixed upon a shaft 23, journaled in bearings formed in the front plate 5 and in the supplemental plate 19.

Fixed upon the shaft 23 between the plates 5 and 6 is a cam-wheel 24, which has formed in its periphery a continuous groove 25, disposed at an angle to the axis of the shaft 23, as clearly shown in Figs. 4 and 6 of the drawings. Coacting with said cam-wheel is a projection 26, provided upon the under side of a horizontally-disposed spur gear or tooth wheel 27, which is journaled to rotate upon a vertical shaft 28, fixed in a cross-bar 29, which extends between the plates 5 and 6 at their upper ends. Said projection 26 is disposed eccentrically upon said gear and has upon its lower end an antifriction-roller 30, which travels in the cam-groove 25, as shown. The coaction of said projection with said cam-wheel is such that when the shaft 23 is rotated the gear 27 will be oscillated, the projection 26 being moved back and forth by said cam.

The gear 27 projects through a slot formed in the front plate 5 and is in mesh with a pinion 31, secured upon the vertically-disposed shaft 32, which is removably journaled in bearings upon the front of the frame. As shown, the upper reduced end of the shaft 32 is journaled in a stationary bracket-arm 33, and the lower portion of said shaft is journaled in a hinged bearing 34, which comprises a plate 35, screwed or otherwise secured upon the front of the plate 5 and formed with a pivoted lug 36, a semicircular bearing 37, and a screw-opening 38. Said bearing also comprises a swinging cover-plate 39, which has one of its ends pivoted to lug 36 and its other end slotted to receive a set-screw 40, which is adapted to enter the said opening 38 to clamp the swinging member 39 upon the stationary member 35, said member 39 being formed at its center with a semicircular bearing 41, which coacts with said bearing 47 to receive the shaft between them. Said shaft 32 has secured to it above the bearing 34 a collar 42, which is adapted to prevent endwise movement of the shaft in the bearing.

The lower end of the shaft 32 is adapted to be connected to a churn-dasher or any other device which it is desired to oscillate. As shown in the drawings, I form the lower end of said shaft with a socket 43, in which the upper end of a churn-dasher 44 is removably secured by means of a set-screw 45. Said dasher extends through an opening in the top or cover 46 of a churn-body 47, which, as shown, is cylindrical in form and mounted upon the base 2 of the frame 1. Said body may be secured upon said base in any desired manner; but, as shown, the same is seated between a series of vertically-projecting studs 48, provided upon the upper side of the base. Said dasher has upon its lower inner end a U-shaped plate 49, the arms of which are bent outwardly in opposite directions and formed with a series of perforations 50, as shown in Fig. 4 of the drawings.

In order to stop and start the motor, I provide a brake, which is here shown in the form of a lever 51, pivoted at one of its ends upon one of the bolts or rods 7 and having intermediate its ends a downwardly-projecting tongue 52, which is adapted to engage the teeth upon the wheel 27 to hold the latter against movement. Said lever is preferably in the form of a heavy piece of wire or a metal rod, bent, as clearly shown in Figs. 3 and 5 of the drawings, a loop or eye 53 being formed intermediate the ends of said lever to engage the upper projecting end of the shaft 28, and the finger or hand loop 54 being provided upon the outer free end of the lever for the purpose of operating it. When the lever is disengaged from the gear 27, it may be turned to a substantially vertical position, so as to hang from the support 7 to hold it out of engagement with the teeth of the said gear.

Any suitable winding means may be provided for the spring-shaft 8; but I preferably secure upon its rear end a ratchet-wheel 55 and mount loosely upon said shaft adjacent to said ratchet-wheel a hand-lever 56. Upon, said lever is pivoted at 57, intermediate its end, a pawl 58, the small end 59 of which is adapted to engage the teeth of said ratchet-wheel. The large weighted end 60 of said pawl is adapted to hold the other end 59 normally out of engagement with said ratchet-wheel, and to said end 60 is pivotally connected an operating-rod 61, which is slidably mounted upon the lever 58. The outer ends of the lever 58 and the rod 60 are bent angularly, as shown, to form handles by means of which they may be readily operated. It will be seen that when the rod 61 is drawn upon the pawl 58 will be held in engagement with the ratchet-wheel, so that when the lever 58 is rocked or oscillated the shaft 8 will be rotated to wind the coil-spring 9.

The operation and advantages of my invention will be readily understood from the foregoing description, taken in connection with the accompanying drawings. It will be seen that when the spring is wound up and the brake-lever 51 is disengaged from the wheel 27 the unwinding of the spring will rotate the shaft 8, the motion of which through the intermediate gear previously described will be imparted to the shaft 23. As said shaft 23 rotates, its wabbling cam-wheel 24 will oscillate the gear 27, and the latter will in turn oscillate the dasher-shaft 32 and the churn-dasher 44. By means of the brake-lever 51 the motor may be started or stopped, as desired. By means of the hinged bearing 34 and the socket connection 43 for the dasher the churn may be readily applied to or removed from the motor, and the dasher and its shaft may be quickly removed from the churn and the machine for cleaning or adjusting them.

While I have shown and described the preferred embodiment of my invention, it will be understood that I do not wish to be limited to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. In a machine of the class described, a revoluble cam provided with a circumferential cam-slot lying in a plane which is oblique to the cam-axis, a gear mounted for oscillation and having a tappet-stud engaging said cam-slot, and a shaft mounted for oscillation and a pinion thereon engaging said oscillating gear, substantially as described.

2. In a machine of the class described, a revoluble cam provided with a circumferential cam-slot lying in a plane which is oblique to the cam-axis, a gear mounted for oscillation and having a tappet-stud engaging said cam-slot, a shaft mounted for oscillation and a pinion thereon engaging said oscillating gear, and a brake-bar having a tongue to engage the teeth of the oscillating gear to lock the same against movement, substantially as described.

In testimony whereof I have hereunto set my hand in presence of two subscribing witnesses.

GEORGE his × mark BOTKIN.

Witnesses:
G. A. TOWNSEND,
J. A. SEAMAN.